(12) United States Patent
DeLaurier et al.

(10) Patent No.: US 8,195,882 B2
(45) Date of Patent: Jun. 5, 2012

(54) SHADER COMPLEX WITH DISTRIBUTED LEVEL ONE CACHE SYSTEM AND CENTRALIZED LEVEL TWO CACHE

(75) Inventors: Anthony P. DeLaurier, Los Altos, CA (US); Mark Leather, Los Gatos, CA (US); Robert S. Hartog, Windermere, FL (US); Michael J. Mantor, Orlando, FL (US); Mark C. Fowler, Hopkinton, MA (US); Marcos P. Zini, Oviedo, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 392 days.

(21) Appl. No.: 12/476,159

(22) Filed: Jun. 1, 2009

(65) Prior Publication Data

US 2010/0146211 A1   Jun. 10, 2010

Related U.S. Application Data

(60) Provisional application No. 61/057,492, filed on May 30, 2008, provisional application No. 61/057,483, filed on May 30, 2008, provisional application No. 61/057,499, filed on May 30, 2008, provisional application No. 61/057,504, filed on May 30, 2008, provisional application No. 61/057,513, filed on May 30, 2008.

(51) Int. Cl.
*G06F 12/00* (2006.01)
(52) U.S. Cl. ............... 711/122; 711/130; 345/582
(58) Field of Classification Search ............... 711/122, 711/130
See application file for complete search history.

(56) References Cited

U.S. PATENT DOCUMENTS

| 6,104,415 | A | 8/2000 | Gossett | |
|---|---|---|---|---|
| 6,326,964 | B1 * | 12/2001 | Snyder et al. | 345/419 |
| 7,136,068 | B1 | 11/2006 | Priem et al. | |
| 7,164,426 | B1 | 1/2007 | Duluk et al. | |
| 7,330,188 | B1 | 2/2008 | Solanki et al. | |
| 7,589,741 | B1 * | 9/2009 | Donham et al. | 345/582 |
| 7,928,990 | B2 * | 4/2011 | Jiao et al. | 345/557 |
| 7,999,821 | B1 * | 8/2011 | Minkin | 345/582 |
| 2004/0189652 | A1 | 9/2004 | Emberling | |
| 2006/0174081 | A1 * | 8/2006 | Latta | 711/168 |

(Continued)

OTHER PUBLICATIONS

Search Report and Written Opinion for International Application No. PCT/US09/03317 mailed Jul. 17, 2009, 6 pages.

(Continued)

*Primary Examiner* — Hashem Farrokh
(74) *Attorney, Agent, or Firm* — Sterne, Kessler, Goldstein & Fox PLLC

(57) ABSTRACT

A shader pipe texture filter utilizes a level one cache system as a primary method of storage but with the ability to have the level one cache system read and write to a level two cache system when necessary. The level one cache system communicates with the level two cache system via a wide channel memory bus. In addition, the level one cache system can be configured to support dual shader pipe texture filters while maintaining access to the level two cache system. A method utilizing a level one cache system as a primary method of storage with the ability to have the level one cache system read and write a level two cache system when necessary is also presented. In addition, level one cache systems can allocate a defined area of memory to be sharable amongst other resources.

17 Claims, 4 Drawing Sheets

U.S. PATENT DOCUMENTS

2006/0250409 A1 11/2006 Bando et al.
2007/0211070 A1 9/2007 Stenson
2008/0094405 A1 4/2008 Bastos et al.
2008/0094407 A1 4/2008 Xu et al.
2008/0094408 A1 4/2008 Yin et al.
2008/0303839 A1* 12/2008 Quennesson et al. ......... 345/557

OTHER PUBLICATIONS

Search Report and Written Opinion for International Application No. PCT/US09/03316 mailed Jul. 17, 2006, 6 pages.

* cited by examiner

SHADER COMPLEX WITH DISTRIBUTED LEVEL ONE CACHE SYSTEM AND CENTRALIZED LEVEL TWO CACHE

CROSS REFERENCE TO RELATED APPLICATIONS

This application claims the benefit under 35 U.S.C. §119(e) to Provisional Patent Application No. 61/057,492 filed May 30, 2008; U.S. Provisional Patent Application No. 61/057,483 filed May 30, 2008; U.S. U.S. Provisional Patent Application No. 61/057,499 filed May 30, 2008; U.S. Provisional Patent Application No. 61/057,504 filed May 30, 2008; and U.S. Provisional Patent Application No. 61/057,513 filed May 30, 2008, which are incorporated by reference herein in their entireties.

BACKGROUND

1. Field of the Invention

The present invention is generally directed to computing operations performed in computing systems, and more particularly directed to graphics processing tasks performed in computing systems.

2. Related Art

A graphics processing unit (GPU) is a complex integrated circuit that is specially designed to perform graphics processing tasks. A GPU can, for example, execute graphics processing tasks required by an end-user application, such as a video game application. In such an example, there are several layers of software between the end-user application and the GPU.

The end-user application communicates with an application programming interface (API). An API allows the end-user application to output graphics data and commands in a standardized format, rather than in a format that is dependent on the GPU. Several types of APIs are commercially available, including DirectX® developed by Microsoft Corp. and OpenGL® developed by Silicon Graphics, Inc. The API communicates with a driver. The driver translates standard code received from the API into a native format of instructions understood by the GPU. The driver is typically written by the manufacturer of the GPU. The GPU then executes the instructions from the driver.

A GPU produces the pixels that make up an image from a higher level description of its components in a process known as rendering. GPUs typically utilize a concept of continuous rendering by the use of pipelines to processes pixel, texture, and geometric data. These pipelines are often referred to as a collection of fixed function special purpose pipelines such as rasterizers, setup engines, color blenders, hieratical depth, texture mapping and programmable stages that can be accomplished in shader pipes or shader pipelines, "shader" being a term in computer graphics referring to a set of software instructions used by a graphic resource primarily to perform rendering effects. In addition, GPUs can also employ multiple programmable pipelines in a parallel processing design to obtain higher throughput. A multiple of shader pipelines can also be referred to as a shader pipe array.

In addition, GPUs also support a concept known as texture mapping. Texture mapping is a process used to determine the texture color for a texture mapped pixel through the use of the colors of nearby pixels of the texture, or texels. The process is also referred to as texture smoothing or texture interpolation. However, high image quality texture mapping requires a high degree of computational complexity.

In addition, GPUs equipped with a Unified Shader also simultaneously support many types of shader processing, from pixel, vertex, primitive, surface and generalized compute are raising the demand for higher performance generalized memory access capabilities.

Texture filters rely on high speed access to local cache memory for pixel data. However, the use of dedicated local cache memory for texture filters typically precludes the use of more general purpose shared memory. While general purpose shared memory is more flexible, it typically has slower response time and hence is less performant.

Given the ever increasing complexity of new software applications, the demands on GPUs to provide efficient and high quality rendering, texture filtering and error correction are also increasing.

What are needed, therefore, are systems and/or methods to alleviate the aforementioned deficiencies. Particularly, what is needed is a distributed level one cache system for each texture filter combined with a centralized, sharable level two cache system.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention. Consistent with the principles of the present invention as embodied and broadly described herein, the present invention includes method and apparatus whereby a shader pipe texture filter utilizes a level one cache system as a primary method of storage but with the ability to have the level one cache system read and write to a level two cache system when necessary. While each level one cache system is associated with a particular shader pipe texture filter, level two cache memory has no such association and is therefore available to all level one cache systems. In addition, level one cache systems can allocate a defined area of memory in the level one cache system to be sharable amongst other resources.

In an embodiment of the invention, a level one cache system is configured with dual access so that two shader pipe texture filters have access to a single level one cache system.

In another embodiment more than one level two cache systems are configured to be accessible by each level one cache systems.

In another embodiment the communication between a level one cache system and a level two cache systems utilizes more than one memory channel thereby resulting in a greater data throughput.

In another embodiment one or more level one cache systems can allocate defined areas of memory in the level one cache system to be shared amongst other resources, including other level one cache systems. In certain instances this approach will allow for quicker fetch times of texel data where the required data has already been moved from a level two cache system to a level one cache system.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated in and constitute part of the specification, illustrate embodiments of the invention and, together with the general description given above and the detailed description of the embodiment given below, serve to explain the principles of the present invention. In the drawings.

Figure 1:
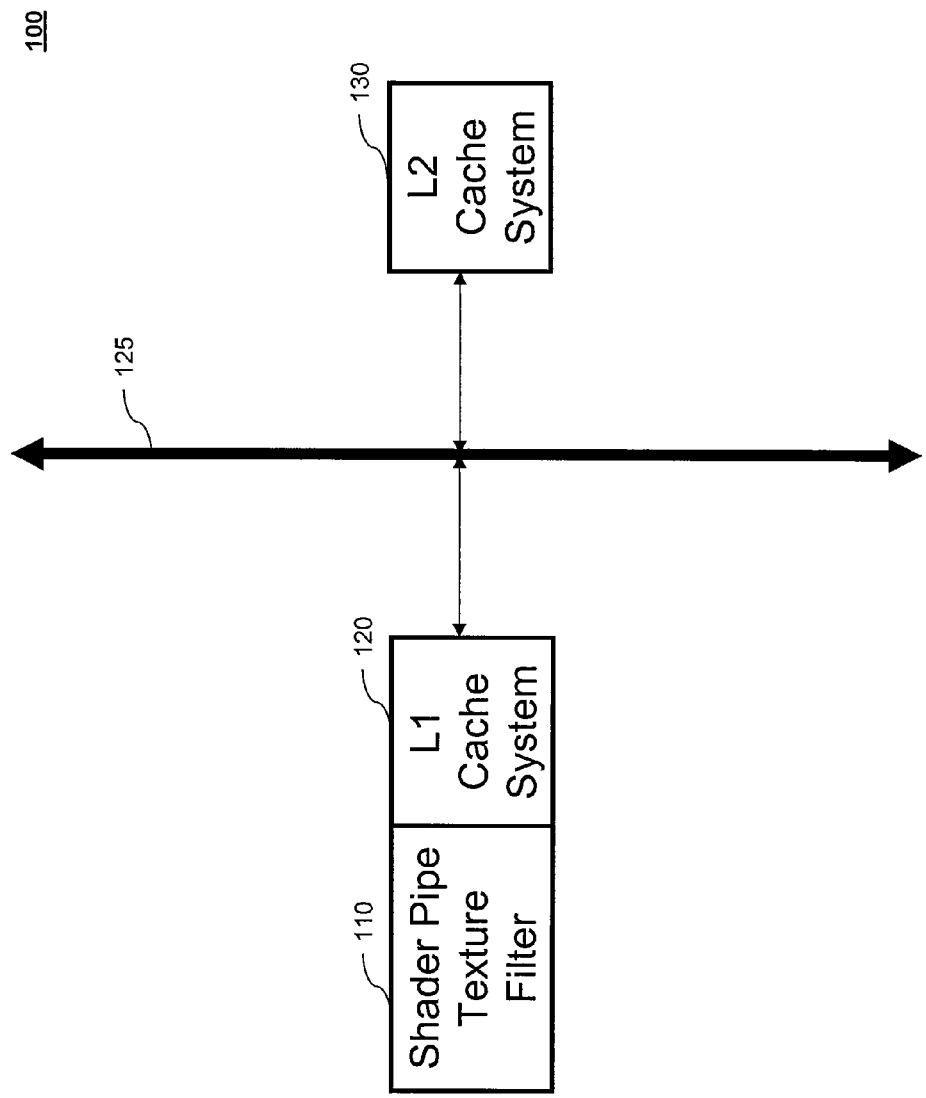
FIG. 1 is a system diagram depicting an implementation of a single level one cache system with a single level two cache system.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The invention will be better understood from the following descriptions of various "embodiments" of the invention. Thus, specific "embodiments" are views of the invention, but each is not the whole invention. In one respect, the present invention relates to a distributed level one cache system with a centralized level two cache system. Each shader pipe texture filter has a dedicated level one cache system configured to provide read and write access to texel data contained within the level one cache system. In addition, there are one or more level two cache systems that are not dedicated to a shader pipe texture filter and as such are accessible by all of the level one cache systems.

While specific configurations, arrangements, and steps are discussed, it should be understood that this is done for illustrative purposes only. A person skilled in the pertinent art(s) will recognize that other configurations, arrangements, and steps can be used without departing from the spirit and scope of the present invention. It will be apparent to a person skilled in the pertinent art(s) that this invention can also be employed in a variety of other applications.

It is noted that references in the specification to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic in connection with other embodiments whether or not explicitly described.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

FIG. 1 is an illustration of a single level one cache system and a single level two cache system 100 according to an embodiment of the present invention. System 100 comprises a single shader pipe texture filter 110 with an associated level one cache system 120 configured to communicate with a level two cache system 130 utilizing a wide channel memory bus 125.

In the embodiment represented in FIG. 1, the shader pipe texture filter 110 employs the concept of bilinear filtering to determine the color of a particular pixel. During bilinear filtering, the shader pipe texture filter 110 analyzes texel data for the four nearest pixels to the pixel in question. The texel data for the four texels is then combined by a weighted average according to distance to calculate the desired result. The texel data in question is retrieved from the level one cache system 120 that is associated with the current shader pipe texture filter 110.

However, if the desired texel data is not in level one cache system 120 at the desired time, then level one cache system 120 issues a read request to level two cache system 130 for the desired texel data. In this instance, the required data is then copied from level two cache system 130 to level one cache system 120 in order to be analyzed and processed by shader pipe texture filter 110.

Figure 2:
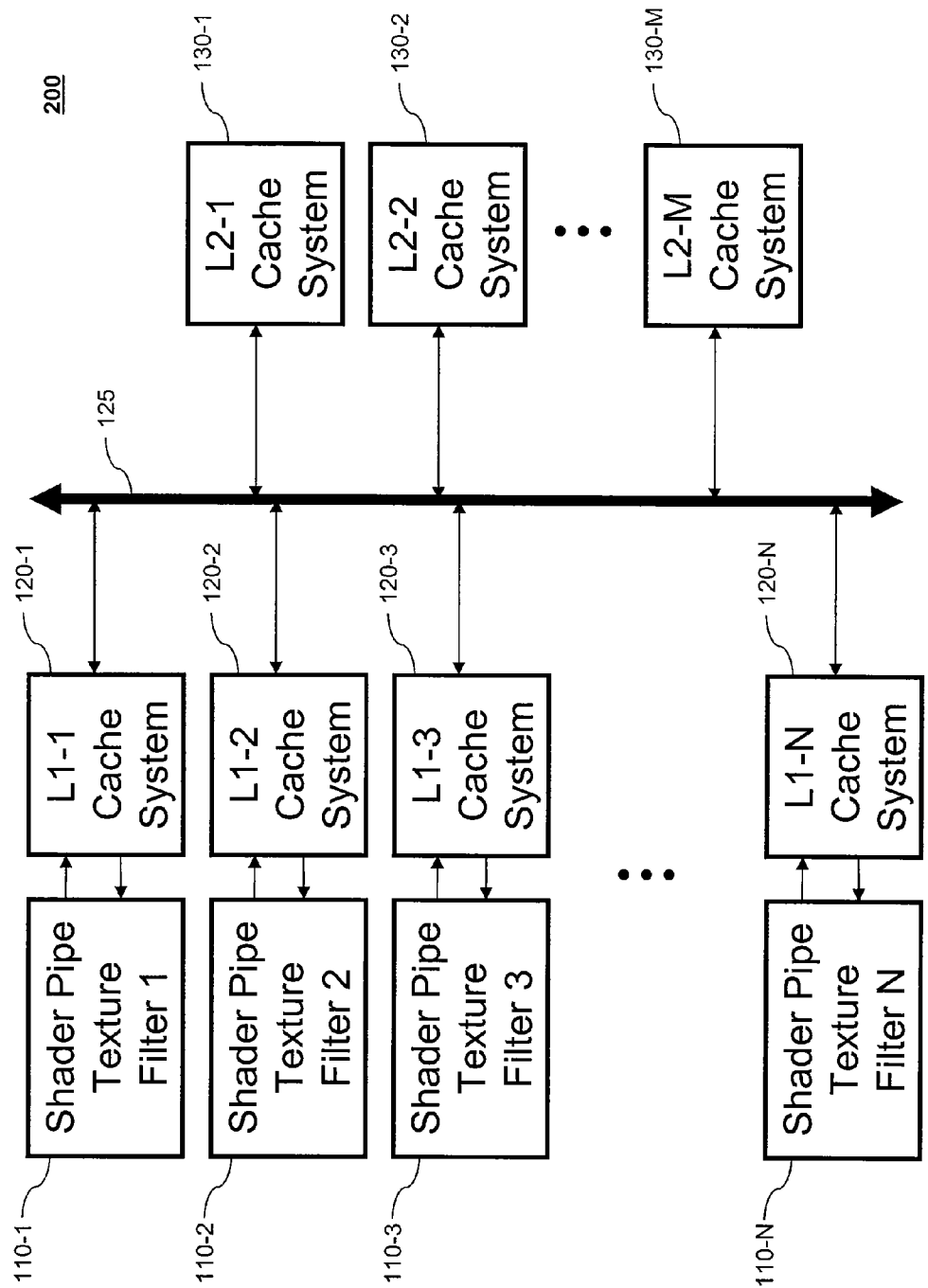
FIG. 2 is a system diagram depicting an implementation of a plurality of level one and level two cache systems.

FIG. 2 is an illustration of multiple shader pipe texture filters with associated level one caches and multiple level two cache systems according to an embodiment of the present invention. System 200 comprises one or more shader pipe texture filters, here represented as shader pipe texture filter 1 through shader pipe texture filter N, labeled 110-1 through 110-N, where "N" represents a positive integer greater than one. System 200 also comprises level one cache systems associated with each shader pipe texture filter, here represented as L1-1 cache system through L1-N cache system, labeled 120-1 through 120-N, where "N" represents a positive integer greater than one. Also included is wide channel memory bus 125 that links level one cache systems 120-1 through 120-N to a set of level two cache systems. In this embodiment the level two cache system includes one or more level two cache systems, here represented as L2-1 cache system through L2-M cache system, where "M" is an integer greater than one and not necessarily the same value as N, the number of level one cache systems.

In the embodiment of FIG. 2, each of the shader pipe texture filters, 110-1 through 110-N, employs the concept of bilinear filtering to determine the color of a particular pixel. As explained above, each shader pipe texture filter, 110-1 through 110-N, needs to analyze the texel data for the four nearest pixels to the pixel in question. Therefore, the texel data in question for each shader pipe texture filter is retrieved from its associated level one cache system. As such, shader pipe texture filter 1, 110-1, issues a request for texel data to L1-1 cache system, 120-1. The remaining shader pipe texture filters will issue texel data requests in a similar manner.

However, if the desired texel data for any particular shader pipe texture filter is not present in its associated level one cache system 120, then that level one cache system can issue a read request to the level two cache system 130 for the desired texel data. In the embodiment of FIG. 2 there are multiple level two cache systems, of which one or more could respond to the level one cache system request for texel data. However, in another embodiment, there can be a single level two cache system while having multiple shader pipe texture filter and associated level one cache systems.

In another embodiment regarding FIG. 2, one or more of the level one cache systems can allocate defined areas of memory in the level one cache system to be shared amongst other resources, including other level one cache systems. In certain instances, this approach allows for quicker fetch times of texel data where the required data has already been moved from a level two cache system to a level one cache system.

Figure 3:
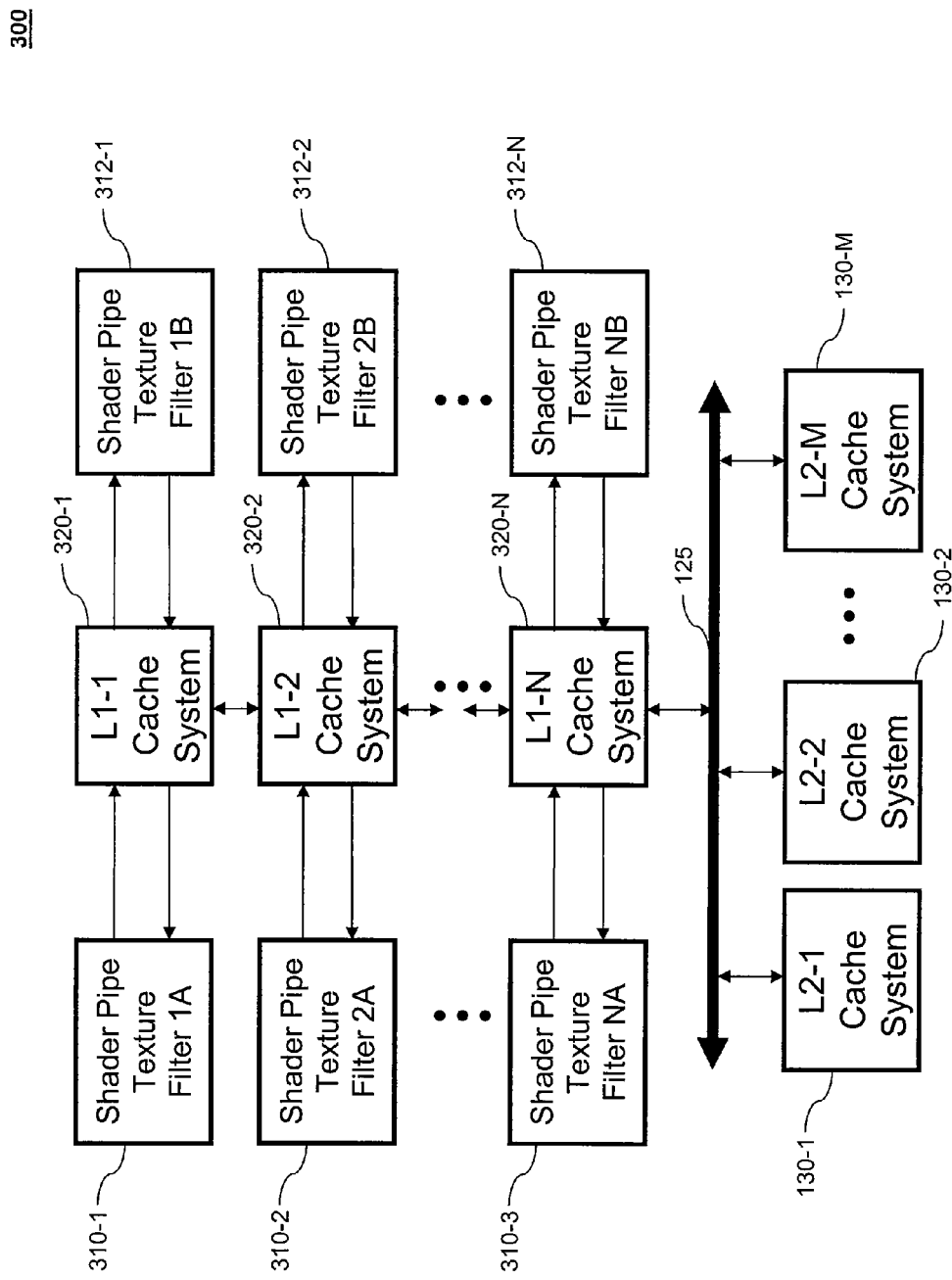
FIG. 3 is a system diagram depicting an implementation of a dual ported level one and a plurality of level two cache systems.

FIG. 3 is an illustration of multiple shader pipe texture filters with associated dual-ported level one caches and multiple level two cache systems according to an embodiment of the present invention. System 300 comprises one or more dual-ported level one cache systems, of which each supports up to two shader pipe texture filters, and a level two cache system. In this embodiment, a level one cache system supports up to two shader pipe texture filters for their requests of texel data. In this embodiment there are one or more level one cache systems illustrated as L1-1 through L1-N, where N is a positive integer, and labeled as 320-1 through 320-N. Here, each level one cache supports two shader pipe texture filters, as illustrated, as shader pipe texture filter A, 310, and shader pipe texture filter B, 312. In addition, the level one caches, 320-1 through 320-N, have access, via wide channel memory bus 125, to the level two cache system illustrated as L2-1 through L2-N, where N is a positive integer.

In another embodiment regarding FIG. 3, one or more of the level one cache systems can allocate defined areas of memory in the level one cache system to be shared amongst other resources, including other level one cache systems. In certain instances, this approach allows for quicker fetch times of texel data where the required data has already been moved from a level two cache system to a level one cache system.

Figure 4:
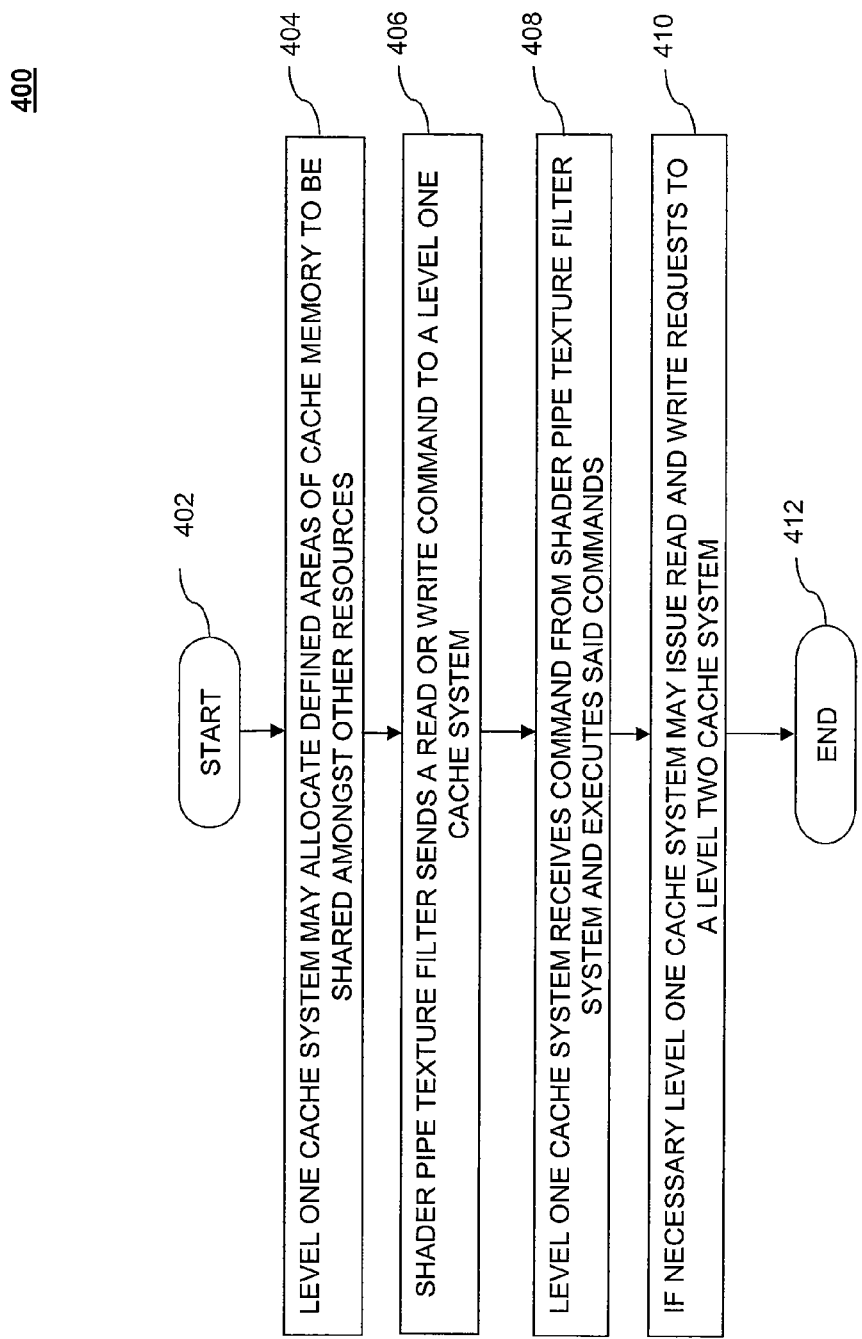
FIG. 4 is a flowchart depicting an implementation of a method for a shader filter cache system.

FIG. 4 is a flowchart depicting a method 400 whereby a shader pipe texture filter utilizes a level one cache system as a primary method of storage with the ability to access a level two cache when necessary. Method 400 begins at step 402. In step 404 each level one cache system can allocate defined areas of memory in the level one cache system as sharable amongst other resources. In step 406, a shader pipe texture filter issues a read or write command to its associated level one cache system. In step 408, the associated level one cache system retrieves or writes texel data, as appropriate. In step 410 each level one cache system can issue read and write requests to a level two cache system. Method 400 concludes at step 412.

The functions, processes, systems, and methods outlined in FIGS. 1, 2, 3, and 4 can be implemented in software, firmware, or hardware, or using any combination thereof. If programmable logic is used, such logic can execute on a commercially available processing platform or a special purpose device.

As would be apparent to one skilled in the relevant art, based on the description herein, embodiments of the present invention can be designed in software using a hardware description language (HDL) such as, for example, Verilog or VHDL. The HDL-design can model the behavior of an electronic system, where the design can be synthesized and ultimately fabricated into a hardware device. In addition, the HDL-design can be stored in a computer product and loaded into a computer system prior to hardware manufacture.

It is to be appreciated that the Detailed Description section, and not the Summary and Abstract sections, is intended to be used to interpret the claims. The Summary and Abstract sections can set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for caching of shader filter data, comprising:
   receiving read and write commands from a shader pipe filter for access to a plurality of level one cache systems;
   executing said commands from the shader pipe filter;
   allocating defined areas of memory in the level one cache system to be shared amongst the plurality of level one cache systems; and
   managing read and write requests from the plurality of level one cache systems to a level two cache system.

2. The method according to claim 1, wherein the receiving comprises receiving from a plurality of shader pipe filters.

3. The method according to claim 1, wherein the shader pipe filter accesses data within any of the shared level one cache systems.

4. The method according to claim 1, wherein the managing read and write requests from the plurality of level one cache system to the level two cache system comprises managing read and write requests from the plurality of level one cache systems to a plurality of level two cache systems.

5. The method according to claim 1, wherein the method is performed by synthesizing hardware description language instructions.

6. A system for caching shader filter data, comprising:
   a processor; and
   a memory in communication with said processor, said memory configured to store a plurality of processing instructions and to direct said processor to:
      receive read and write commands from a shader pipe filter for access to a plurality of level one cache systems;
      execute said commands from the shader pipe filter;
      allocate defined areas of memory in the level one cache system to be shared amongst the plurality of level one cache systems; and
      manage read and write requests from the plurality of level one cache systems to a level two cache system.

7. The system according to claim 6, further comprising instructions configured to cause said processor to:
   manage commands from a plurality of shader pipe filters.

8. The system according to claim 6, further comprising instructions configured to cause said processor to:
manage the plurality of level one cache systems.

9. The system according to claim 6, further comprising instructions configured to cause said processor to:
manage a plurality of level two cache systems.

10. A system for caching shader filter data, comprising:
means for receiving read and write commands from a shader pipe filter for access to a plurality of level one cache systems;
means for executing said commands from the shader pipe filter;
means for allocating defined areas of memory in the level one cache system to be shared amongst the plurality of level one cache systems; and
means for managing read and write requests from the plurality of level one cache systems to a level two cache system.

11. The system according to claim 10, further comprising:
means for managing commands from a plurality of shader pipe filters.

12. The system according to claim 10, further comprising:
means for managing the plurality of level one cache systems.

13. The system according to claim 10, further comprising:
means for managing a plurality of level two cache systems.

14. A non-transitory computer readable medium carrying one or more sequences of one or more instructions execution of which by one or more processor-based computer systems cause the computer systems to perform a method of caching shader filter data, the method including operations comprising:
receiving read and write commands from a shader pipe filter for access to a plurality of level one cache systems;
executing said commands from the shader pipe filter;
allocating defined areas of memory in the level one cache system to be shared amongst the plurality of level one cache systems; and
managing read and write requests from the plurality of level one cache systems to a level two cache system.

15. The non-transitory computer readable medium according to claim 14, the method further including operations comprising managing commands from a plurality of shader pipe filters.

16. The non-transitory computer readable medium according to claim 14, the method further including operations comprising managing the plurality of level one cache systems.

17. The non-transitory computer readable medium according to claim 14, the method further including operation comprising managing a plurality of level two cache systems.

* * * * *

UNITED STATES PATENT AND TRADEMARK OFFICE
CERTIFICATE OF CORRECTION

| | | |
|---|---|---|
| PATENT NO. | : 8,195,882 B2 | Page 1 of 1 |
| APPLICATION NO. | : 12/476159 | |
| DATED | : June 5, 2012 | |
| INVENTOR(S) | : DeLaurier et al. | |

It is certified that error appears in the above-identified patent and that said Letters Patent is hereby corrected as shown below:

Column 6
Line 45, Claim 4, replace "system" with --systems--.

Column 8
Line 24, Claim 17, replace "operation" with --operations--.

Signed and Sealed this
Fourteenth Day of August, 2012

David J. Kappos
*Director of the United States Patent and Trademark Office*